Patented Feb. 26, 1946

2,395,454

UNITED STATES PATENT OFFICE 2,395,454

THIOCYANO ALIPHATIC ETHERS OF HYDROXYDIHYDRONORDICYCLOPENTADIENE

Herman A. Bruson, Philadelphia, Pa., assignor to The Resinous Products & Chemical Company, Philadelphia, Pa., a corporation of Delaware No Drawing. Application September 12, 1944, Serial No. 553,801

7 Claims. (Cl. 260—454)

This invention relates to new thiocyano aliphatic ethers of hydroxydihydronordicyclopentadiene. These ethers have the general formula

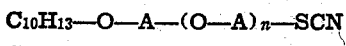

wherein $C_{10}H_{13}$ represents the dihydronordicyclopentadienyl group, A is an alkylene group having a chain of at least two carbon atoms, and $n$ is zero or a whole number.

This application is a continuation-in-part of my copending application Serial No. 476,640, filed February 20, 1943, wherein there is disclosed the reaction of alcohols with polycyclopentadienes having two double bonds per molecule in the presence of acidic condensing agents. In this reaction, the alcohol is added to one of these double bonds of the endomethylene cycle with a simultaneous rearrangement of this cycle to an endoethylene cyclopentano system having a cyclopenteno group attached thereto. The new ring system has been named "norpolycyclopentadiene" generically and "nordicyclopentadiene" for the specific system from dicyclopentadiene. The alcohols corresponding thereto may be termed hydroxydihydronorpolycyclopentadiene and hydroxydihydronordicyclopentadiene respectively. The ethers of the latter alcohol and thiocyano aliphatic alcohols are the subject matter claimed herein.

The reaction which occurs when a thiocyano aliphatic monohydric alcohol reacts with dicyclopentadiene may be represented as follows:

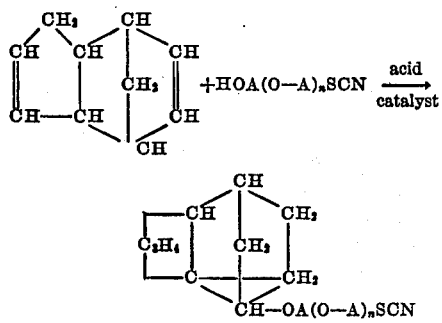

wherein $C_3H_4$ is a propenylene group which in conjunction with the adjoining carbon atoms forms a cyclopenteno group.

Thiocyano alcohols, which correspond to the above general formula where $n$ is one to three, have been set forth by applicant in application Serial No. 526,483, filed March 14, 1944, now Patent No. 2,372,809, April 3, 1945. These are prepared by heating a polyalkylene halohydrin in water or an inert organic solvent at about 50° C. to about 150° C. with a salt of thiocyanic acid, such as sodium, potassium, calcium, lead or ammonium thiocyanate.

Where thiocyano alcohols are not available and as an alternative method, the compounds of this invention may be prepared by first reacting a halohydrin with dicyclopentadiene in the presence of an acidic condensing agent and converting the resulting halo-aliphatic ether of hydroxydihydronordicyclopentadiene to the thiocyanate by metathesis with a salt of thiocyanic acid, thus

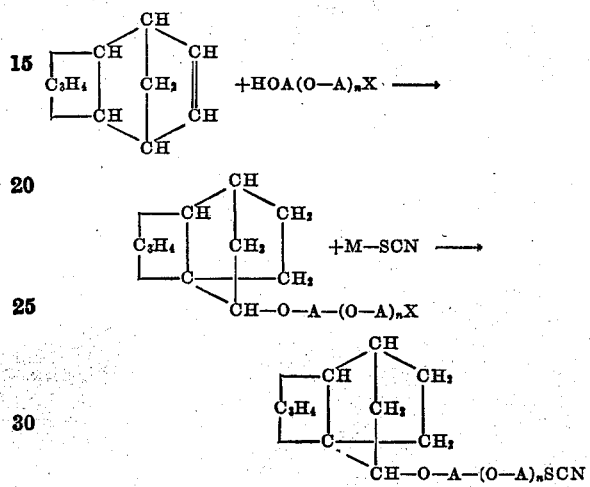

Typical alcohols which may be used in the above reactions are the following:

$HOCH_2CH_2Cl$ or the corresponding bromide
$HOCH(CH_3)CH_2Cl$ or the corresponding bromide
$HOCH_2CH_2CH_2Cl$ or the corresponding bromide
$HOCH_2CH_2CH_2CH_2Cl$ or the corresponding bromide
$HOCH_2CH_2OCH_2CH_2Cl$ or the corresponding bromide
$HOCH_2CH(CH_3)OCH(CH_3)CH_2Br$
$HOCH_2CH_2OCH_2CH_2OCH_2CH_2Cl$
$HOCH_2CH_2CH_2CH_2Br$
$HOCH_2CH_2OCH_2CH_2SCN$
$HOCH_2CH(CH_3)OCH(CH_3)CH_2SCN$
$HOCH_2CH_2CH_2OCH_2CH_2CH_2SCN$
$HOCH_2CH_2OCH_2CH_2OCH_2CH_2SCN$
$HOCH_2CH_2OCH_2CH_2OCH_2CH_2OCH_2CH_2SCN$
$HOCH_2CH_2(OCH_2CH_2)_nSCN$ where $n$ is an integer up to 15 or more.

The following examples present details of some of the preferred ways of preparing the compounds of this invention:

Example 1

To a stirred solution of 53 grams of dicyclopentadiene and 56 grams of β-thiocyanoethoxyethanol at 60° C. there was added 10 grams of boron trifluoride-diethyl ether complex

$BF_3 \cdot O(C_2H_5)_2$.

The mixture was stirred at 68–70° C. for five and one-half hours, then washed with dilute sodium carbonate solution, and finally with water. The product was dried and distilled in vacuo to yield β-thiocyanoethoxyethoxydihydronordicyclopentadiene having the probable formula

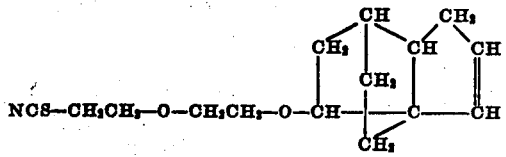

as a colorless oil boiling at 195–198° C./3 mm. having the following constants:

$n_D^{25}$ 1.5251; $d_4^{25}$ 0.9415

Example 2

To a stirred solution of 623 grams of β-chloroethoxyethanol and 9 grams of boron trifluoride at 95° C. there was gradually added 695 grams of dicyclopentadiene during the course of forty-five minutes. The mixture was then stirred for nine hours at 90–95° C., and finally worked up by washing with dilute soda solution and water, drying, and distilling in vacuo.

The β-chloroethoxy ethoxydihydronordicyclopentadiene of the probable formula

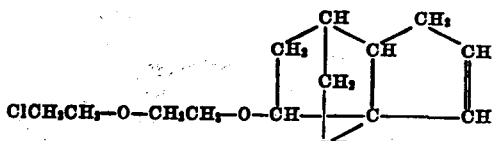

distilled over at 150–160° C./3–4 mm. as a colorless oil in a yield of 470 grams.

This product was then mixed with 212 grams of sodium thiocyanate, 198 grams of methyl isobutyl ketone, 15 grams of β-ethoxyethanol, 1 gram of copper powder and 2 grams of sodium bromide and heated with stirring for 24 hours at 130° C. under reflux. The product was then washed with water and distilled in vacuo to yield 390 grams of β-thiocyanoethoxyethoxydihydronordicyclopentadiene boiling at 180–190° C. (1–2 mm.) having the same physical and chemical properties as the product described in Example 1.

Example 3

To a stirred solution of 47.3 grams of trimethylene chlorhydrin and 3 grams of boron trifluoride-dibutyl ether complex $BF_3 \cdot O(C_4H_9)_2$ at 75–85° C. there was gradually added during the course of twenty minutes 70 grams of dicyclopentadiene. The mixture was stirred and heated at 90° C. for three and one-quarter hours. The dark oil which was obtained was washed with dilute sodium hydroxide solution and then with water, dried, and distilled in vacuo. The γ-chloropropyl ether of hydroxydihydronordicyclopentadiene, $C_{10}H_{13}$—O—$CH_2CH_2CH_2Cl$, distilled over at 110–120° C./2 mm. as a colorless oil in a yield of 30 grams. Upon redistillation the pure compound boiled at 114–115° C./1.5 mm.

One molecular equivalent of the above compound was mixed with 1.1 moles of powdered potassium thiocyanate and twice its weight of methyl isobutyl ketone together with 0.5% by weight of copper powder and 1% by weight of sodium iodide. The mixture was boiled for 24 hours, then washed, filtered, and dried. The solvent was removed by evaporation in vacuo. The residual oil consisted essentially of the γ-thiocyanopropyl ether of hydroxydihydronordicyclopentadiene having the formula $C_{10}H_{13}$—O—$CH_2CH_2CH_2SCN$

Example 4

To 160 grams of ethylene chlorhydrin cooled to 5° C. there was gradually added 25 grams of 98% sulfuric acid while the reaction mixture was stirred and maintained at 15°–20° C. After all the sulfuric acid had been added, the mixture was allowed to come to room temperature (28° C.) and then stirred with 132 grams of pure dicyclopentadiene. A gradual exothermal reaction set in during which the temperature rose to 75° C. within half an hour. After this had subsided the mixture was stirred at 90–95° C. for two and one-quarter hours. The product was washed with water and the residual oil was taken up in toluene and made alkaline by the addition of calcium hydroxide. The product was filtered and the filtrate distilled under reduced pressure. The β-chloroethoxydihydronordicyclopentadiene of the probable formula

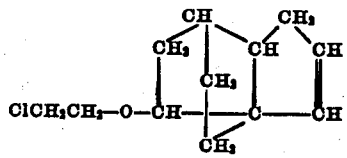

distilled over at 125–131° C./6 mm. as a colorless or faintly yellow oil in a yield of 125 grams. Upon redistillation it came over as a colorless oil of pleasant odor boiling at 129–131° C./7 mm.

A mixture of 212.5 grams of the above β-chloroethoxydihydronordicyclopentadiene, 107 grams of methyl isobutyl ketone, 10 grams of β-ethoxyethanol, 0.5 gram of copper powder, 0.5 gram of sodium bromide and 116 grams of pure sodium thiocyanate was stirred at 132–148° C. for 24 hours. The product was then cooled, washed with water several times, filtered, dried, and distilled in vacuo. The β-thiocyanoethoxydihydronordicyclopentadiene of the probable formula:

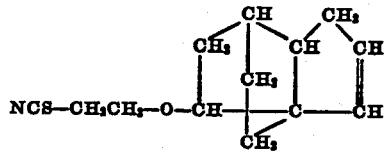

distilled over at 155–165° C./1–2 mm. as a colorless oil in a yield of 180 grams. Upon redistillation the pure compound was obtained as a colorless oil boiling at 147–149° C./1 mm.

In the same manner as in Example 4, β-chloropropyloxydihydronordicyclopentadiene, $C_{10}H_{13}$—O—$CH_2$—$CHCl$—$CH_3$ yields the corresponding β-thiocyanopropyloxydihydronordicyclopentadiene as a colorless oil having insecticidal properties.

The thiocyano aliphatic ethers of hydroxydihydronordicyclopentadiene are high boiling liquids which are useful as softeners for gummy and resinous compositions. They are useful as toxicants in insecticidal compositions and may be used in lubricating oil compositions in giving better film strength, preventing corrosion, etc.

I claim:
1. As a new compound, a thiocyano aliphatic ether of hydroxydihydronordicyclopentadiene having the formula

$$C_{10}H_{13}-O-A-(O-A)_n-SCN$$

wherein $C_{10}H_{13}-$ represents the dihydronordicyclopentadienyl radical, A is an alkylene group having a chain of at least two carbon atoms, and $n$ is a number from zero to a small integer.

2. β - Thiocyanoethoxydihydronordicyclopentadiene having the formula $$C_{10}H_{13}-O-CH_2CH_2SCN$$

3. β-Thiocyanoethoxyethoxydihydronordicyclopentadiene having the formula $$C_{10}H_{13}-O-CH_2CH_2-O-CH_2CH_2SCN$$

4. As a new compound, a thiocyano aliphatic ether of hydroxydihydronordicyclopentadiene having the formula $$C_{10}H_{13}-O-CH_2CH_2-(O-CH_2CH_2)_n-SCN$$

wherein $n$ is a number from zero to three.

5. A method for preparing a thiocyano aliphatic ether of hydroxydihydronordicyclopentadiene which comprises adding together dicyclopentadiene and an aliphatic monohydric thiocyano alcohol in the presence of an acidic condensing agent with simultaneous molecular rearrangement.

6. A method for preparing a thiocyano aliphatic ether of hydroxydihydronordicyclopentadiene which comprises adding together dicyclopentadiene and an aliphatic monohydric thiocyano alcohol in the presence of a boron trifluoride catalyst with simultaneous molecular rearrangement.

7. A method for preparing $$C_{10}H_{13}-O-CH_2CH_2-O-CH_2CH_2SCN$$

wherein $C_{10}H_{13}-$ is the dihydronordicyclopentadienyl group which comprises adding together dicyclopentadiene and β-thiocyanoethoxyethanol in the presence of a boron trifluoride catalyst with a simultaneous molecular rearrangement.

HERMAN A. BRUSON.